UNITED STATES PATENT OFFICE

2,155,555

ISO-ALLOXAZINE DERIVATIVES AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application July 9, 1935, Serial No. 30,565. In Germany August 18, 1934

2 Claims. (Cl. 260—211)

The condensation of alloxan with o-phenylene-diamine has already been carried out. So far however only alloxazine compounds corresponding to the Formula I (Berichte der Deutschen Chemischen Gesellschaft vol. 24, 1891, page 2363; vol. 27, 1894, page 2116; vol. 28, 1895, page 1968) and N-methyl-iso-alloxazine (Berichte der Deutschen Chemischen Gesellschaft vol. 67, 1934, page 1460) according to Formula II have been obtained:

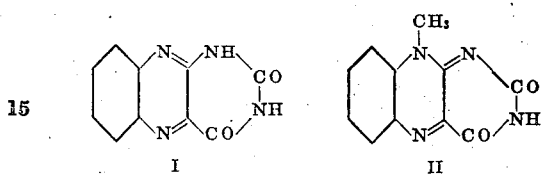

Iso-alloxazines, which contain hydroxyl groups in the side chain attached to the nitrogen, are not yet known.

It has now been found, that by the condensation of derivatives of o-phenylene-diamine, which possess a hydroxylated side chain attached to an amino group, with alloxan or alloxan derivatives, for instance methylated alloxan, new therapeutically valuable compounds may be obtained.

The conversion takes place according to the general equation:

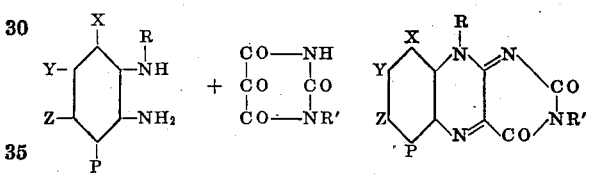

wherein X, Y, Z, P and R' represent either hydrogen or alkyl radicals, R a side chain containing an OH group, for instance —CH$_2$OH, —CH$_2$CH$_2$OH, —CH$_2$CH(OH)CH$_2$OH, —CH$_2$CH(OH)—CH(OH)—CH(OH)CH$_2$OH, or —CH$_2$—(CHOH)$_4$—CH$_2$OH.

The condensation takes place by bringing the participants in the conversion or their salts together in suitable solvents, such as water, alcohol, glacial acetic acid etc., whereby the conversion may be accelerated by heating.

The exchange of the methyl group on the nitrogen atom in 9-position by an alkyl radical with one or more hydroxyl groups will considerably alter the properties of the iso-alloxazines. Neither alloxazine and its derivatives substituted in the benzene ring, nor N-methyl-iso-alloxazine possess any vitamin action, whereas the new compounds very decidedly influence the growth.

The iso-alloxazine derivatives, which possess a hydroxylated side chain attached to the nitrogen atom, differ from the iso-alloxazines heretofore known in that they are very sensitive to light.

Example 1

Equimolecular quantities of 2.3-dihydroxy-propyl-1-o-phenylene-diamine hydrochloride and alloxan are heated in alcohol. The solution turns yellow and on cooling, in given cases after evaporation, the Compound I is precipitated from the solution:

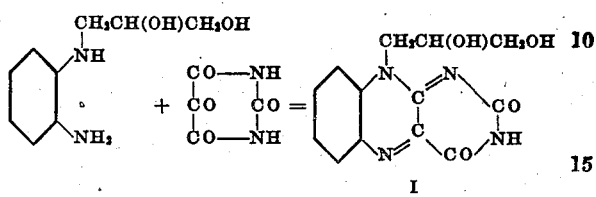

The compound crystallizes from water or dilute alcohol in yellow pointed rhomboid leaflets and broad needles. It dissolves with some difficulty in boiling water the solution being of a deep yellow colour and showing a yellow-green fluorescence. The melting point of the compound lies at about 300° C.

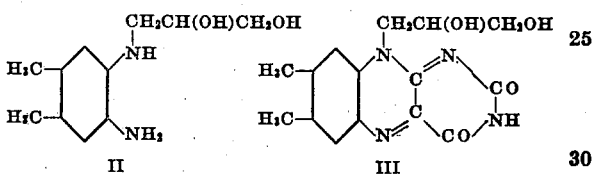

If for the condensation with alloxan the dimethyl Compound II is used, the iso-alloxazine Compound III is obtained, which in all its properties is similar to Compound I.

Example 2

4.5 parts by weight of N-hydroxy-ethyl-o-phenylenediamine hydrochloride, obtained by condensation of o-nitrochloro-benzene and ethanolamine and reduction of the N-hydroxyethyl-o-nitro-aniline thus obtained, are heated with 5.5 parts by weight of alloxan in aqueous solution for a few minutes to boiling point. Already from the hot reaction product a yellow-brown precipitate is obtained which increases on cooling. The compound thus obtained is the 9-hydroxy-ethyl-iso-alloxazine:

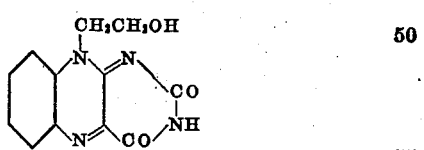

The 9-hydroxy-ethyl-iso-alloxazine is recrystallized from boiling water. Deep yellow crystalline needles are obtained, which turn dark brown at 300° C. and are decomposed with frothing at 310° C. In water and alcohol the compound is dissolved showing a clear yellow colour and deep yellow-green fluorescence.

*Example 3*

5 parts by weight of 2-carbethoxy-aminophenyl-arabinamine are dissolved in 80 parts by weight of double normal aqueous solution of sodium hydroxide by slight heating. The liquid is left to stand for 4 hours at 40–50° C. The carbethoxy group is thus saponified. By acidifying the solution with hydrochloric acid the free substituted carbonic acid is decomposed and carbonic acid is split off, the o-amino-phenyl-arabinamine being thus brought into solution. To the slightly acid solution 5 parts by weight of alloxan are added and the reaction product heated for 15 minutes to boiling point. The solution acquires a deep yellow-brown colour and contains large quantities of the iso-alloxazine dye

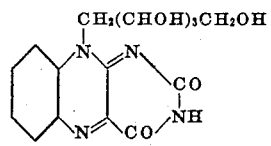

which after cooling crystallizes from the solution. It is fairly easily soluble in hot water, difficultly soluble in cold water or in alcohol. Its solution is of a pure yellow colour with a deep yellow-green fluorescence.

From 4.5-dimethyl-2-carbethoxy-aminophenyl-1-arabinamine and alloxan the compound

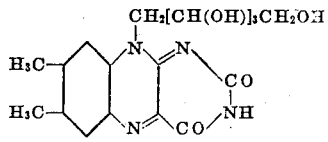

is obtained in corresponding manner. The compound crystallizes in needle bunches melting at 298° C. and rotates to the left in dilute solution of sodium hydroxide. The tetra-acetate melts at 213–215° C.

*Example 4*

20 parts by weight of 5-methyl-2-acetylaminophenyl-d-sorbitylamine are boiled with 13 parts by weight of alloxan and 100 parts by weight of 10% aqueous hydrochloric acid for half an hour in the dark, the solution thus acquiring a dark yellow colour. The solution is diluted with much water and a bleaching clay sold under the trade mark "Frankonit" is added which absorbs the iso-alloxazine dye. The product is elutriated with a dilute pyridine solution, the solvent evaporated, the residue dissolved in water and an adsorbate of the dye on lead sulphide prepared. From this adsorbate the dye can again be removed with hot water. After repeating this purifying process once or twice, the product is evaporated to dryness and the residue taken up in alcohol, from which on cooling the iso-alloxazine compound

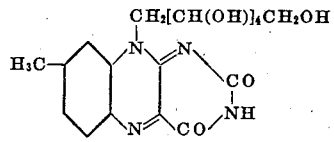

is separated. It is a light yellow powder, its solution being yellow in colour and showing a deep yellow-green fluorescence. It cannot be extracted from the aqueous solution with chloroform. When exposed to light the solutions of the dye are rapidly decolorized.

*Example 5*

45 parts by weight of 4.5-dimethyl-2-carbethoxy-amino-phenyl-d-ribamine (obtained by hydrogenation of a mixture of d-ribose and 4.5-dimethyl-2-carbethoxy-amino-1-amino-benzene) are saponified with 2000 parts by weight of 2/n sodium hydroxide solution for 8 hours at 40° C. Concentrated hydrochloric acid is then added until the reaction is acid to Congo paper and after the addition of 50 parts by weight of alloxan the product is boiled for 15 minutes. The iso-alloxazine dye thus obtained is separated and purified by stirring the reaction product with fuller's earth. After separating the aqueous phase it is extracted with a volatile organic solvent and the solvent removed by evaporation. The residue is then recrystallized from water. In this example fuller's earth may be replaced by lead sulphide.

The 6.7-dimethyl-9-[d,1'-ribityl]-iso-alloxazine crystallizes in rosettes or clusters of fine needles melting at 278–280° C.

*Example 6*

5 parts by weight of 5-methyl-2-carbethoxy-amino-phenyl-d-ribamine (obtained from 1-amino-2-carbethoxy-amino-5-methyl-benzene and d-ribose by reduction of the mixture with hydrogen and a catalyst) are saponified in 150 parts by weight of 2/n sodium hydroxide solution for 5 hours at 50° C. The product is then acidified with concentrated hydrochloric acid, 5 parts by weight of alloxan are added and the solution boiled for 10 minutes. It turns deep yellow in colour. After diluting the solution the iso-alloxazine dye is absorbed on fuller's earth. After separating the aqueous phase the adsorbate is extracted with a volatile organic solvent and the solvent removed by evaporation. The dye may be purified by absorption with lead sulphide. After eluting the lead sulphide adsorbate with boiling water the solution is evaporated and the residue crystallized from water.

The 7-methyl-9-[d,1'-ribityl]-iso-alloxazine crystallizes in yellow needles melting at 275° C., which dissolve in water, the solution being of a deep yellow colour and yellow-green fluorescence. In the biological test it has the same influence on the growth as vitamin B₂ (lactoflavine).

I claim:

1. The 7-methyl-9-[d,1'-ribityl]-iso-alloxazine, the new compound crystallizing in yellow needles melting at 275° C., dissolving in water with yellow colouring and having an influence on the weight increase of test animals characteristic for vitamin B₂.

2. The compounds of the formula

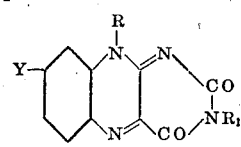

wherein Y is an alkyl radical, R₁ is selected from the group consisting of hydrogen and alkyl radicals, and R is a hydroxylated side chain, the compounds dissolving in water with yellow coloring, being very sensitive to light and having an influence upon the weight increase of test aminals characteristic of vitamin B₂.

PAUL KARRER.